Oct. 1, 1968    J. D. REPKO ET AL    3,404,322
ROTARY CAPACITOR WITH INSULATED ELECTRODES
Filed March 21, 1967

INVENTORS
JAN D. REPKO
MARINUS G. VERHEIJDEN
JAN LEFEBER
BY

AGENT

United States Patent Office 3,404,322
Patented Oct. 1, 1968

3,404,322
ROTARY CAPACITOR WITH INSULATED
ELECTRODES
Jan Dirk Repko, Marinus Gerard Verheijden, and Jan Lefeber, Emmasingel, Eindhoven, Netherlands, assignors to North American Philips Company Inc., New York, N.Y., a corporation of Delaware
Filed Mar. 21, 1967, Ser. No. 624,950
Claims priority, application Netherlands, Mar. 22, 1966, 6603708
4 Claims. (Cl. 317—253)

ABSTRACT OF THE DISCLOSURE

A rotary capacitor in which the stator plates are precisely located on a frame rod structure which interconnects a front and rear frame plate. The frame plates are fabricated out of insulation material. A metal plate supports the front frame plate and a rotary shaft containing the rotor plates is journalled therein.

This invention relates to rotary capacitors, more particularly of the type having insulating layers between the electrode plates, having a rear frame plate, a front frame plate, and frame rods of insulating moulded material which are integral, at least in part, with the front frame plate and which support stator plates.

In a known construction the rotor shaft is journalled in the insulating front plate of the frame. Extreme tolerance requirements have to be imposed upon the accuracy of the journal bearing. This is necessary since the rotor plates have a small radius, approximately 1 cm., thus a comparatively small clearance between the journalled shaft and the plate permit considerable lateral shifts of the rotor relative to the stator resulting in impermissible large changes in the adjusted capacity. Consequently, the rotor shaft must be journalled in the front frame plate of synthetic material substantially without play. A shaft which fits satisfactorily at room temperature may stick at lower temperature due to the comparatively high coefficient of expansion of synthetic material. One of the objects of the invention is to eliminate this disadvantage.

In the prior art rotary capacitor the rear frame plate is fixed by means of nuts screwed onto the free ends of the frame rods. The front and rear frame plates are insulated from each other usually by fabricating the frame rods out of an insulating material, usually a synthetic resin. Lest the metal nuts must be screwed on a thread formed on synthetic material, metal threaded bolts may be embedded in the frame rods. The manufacture of the front frame plate, and the composite frame rods, is time consuming and expensive.

According to the invention the frame rods which support the stator plates are given a tubular shape and the frame plates are fabricated from synthetic resin. A metal bolt is passed through an aperture in the rear plate and through the bore of one of the frame rods and an opposing aperture in the front frame plate. The metal bolt is screwed into a metal front plate arranged against the front side of the front frame plate. The metal front plate supports the shaft of the capacitor.

The shaft is journalled in the metal front plate and therefore will not bind during variations in temperature. The metal front plate may also contain the threaded holes for receiving the metal bolts used to secure the capacitor. This provides the advantage that the metal front plate supports the front frame plate thus eliminating the possibility of warping of the front frame plate. The parts of synthetic material are manufactured without embedded parts and are therefore inexpensive to manufacture.

In order that the invention may be readily carried into effect it will now be described in detail with reference to the accompanying drawing, in which.

Figure 1:
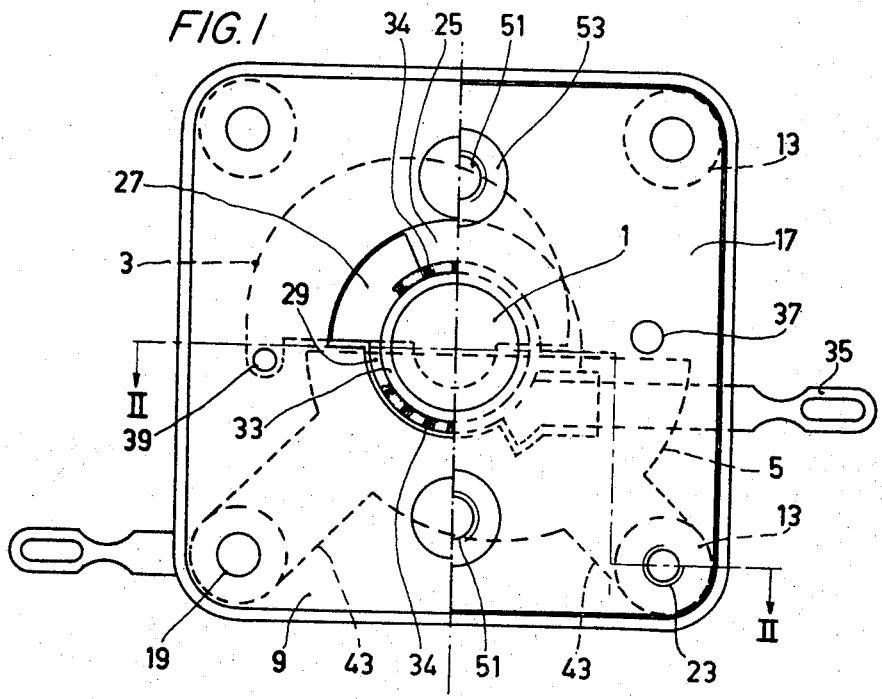
FIGURE 1 is an elevational view of one embodiment.
Figure 2:
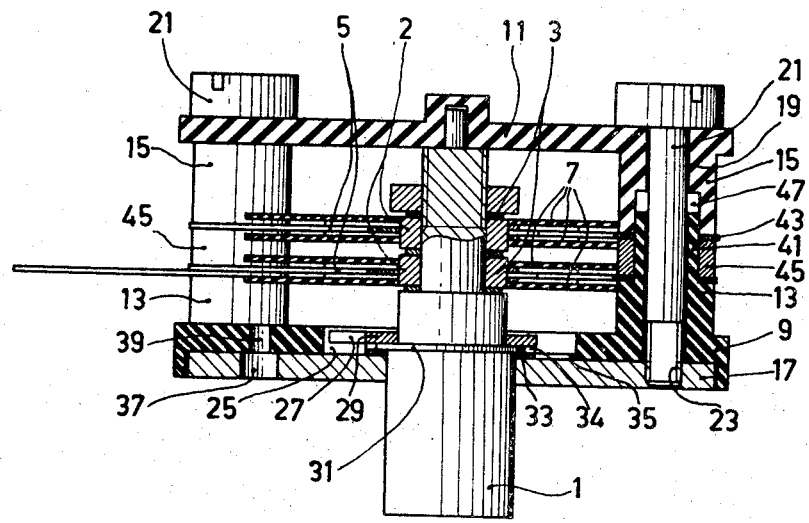
FIGURE 2 shows a substantially axial section thereof, taken on the broken line II—II of FIGURE 1.

The capacitor shown includes a plurality of rotor plates 3 and stator plates 5 secured between spacer rings 2 on a metal shaft 1. The two kinds of electrode plates are separated by insulating layers, in this example insulating foils 7 of a suitable synthetic material, which constitute substantially the dielectric of the capacitor. The frame of the capacitor is formed substantially by a front frame plate 9 and a rear frame plate 11, both of an insulating synthetic material, which are connected together by four frame rods, each constituted by two parts 13 and 15 coaxially aligned with each other. The rotor shaft 1 is journalled in a suitable central aperture of a metal front plate 17 arranged against the front of the frame plate 9, and in a suitable central aperture in the rear frame plate 11 (the left-hand half of the metal front plate 17 is shown as removed in FIGURE 1 for the sake of clarity). Several of the frame rods 13, 15 in this example the lower two in FIGURE 1, support the stator plates 5 of the capacitor. FIGURE 2 shows that the front parts 13 of the frame rods are formed integrally with the front frame plate 9, whereas the rear parts 15 of the frame rods are preferably formed integrally with the rear frame plate 11.

The frame rods 13, 15, those which support the stator plates, are given a tubular shape and have co-axial bores 19, which extend through the frame plates 9 and 11. Through each bore 19 passes, from the rear side of the capacitor, a bolt 21 which is screwed in a threaded aperture 23 of the metal front plate 17 and which serves to hold the capacitor together. The front frame plate 9 is provided with a cavity 25 substantially in the form of a segment of a circle, in which a radial projection 27 of the ring 29 secured to the rotor shaft 1 can rotate through an angle of approximately 180°. The projection 27 serves as a stop for the rotor shaft 1. The ring 29 engages the rear side of a flange 31 formed on the rotor shaft 1. Between the flange and the plate 17 is a sliding ring 33 of synthetic material, for example polytene, which forms an axial bearing with the flange and the plate. Between the ring 29 and the plate 17 lies an undulated metal ring 34 which loosely surrounds the flange 31 and serves as a sliding contact, the ring being formed with a connecting tongue 35.

In mass production of the capacitor described it is necessary to ensure that the capacitance curve (the variation in capacity as a function of the angle of rotation) of each manufactured capacitor corresponds to a predetermined curve within comparatively narrow tolerances. This implies that the positioning of the rotor shaft with the associated rotor plates relative to the stator plates must satisfy certain requirements of accuracy. To achieve this, it is desirable to provide the frame with means which permit correct relative positioning of the rotor shaft 1 and the plate 9. The plate 9 with the integral frame rod 13 substantially determines the location of the stator plates 5. The means includes two aligned apertures 37 and 39, respectively, of different diameters provided in the plates 17 and 9, a set pin (not shown in FIGURE 1 for the sake of clarity) for insertion into the aperture 37 with clearance and into the aperture 39 as an accurate fit when the capacitor is assembled in a suitable jig. The jig also includes suitable bore for accommodating the rotor shaft 1. As a rule, two such set pins are used and these pins may also serve to keep the insulating foils and the rotor plates properly centred during the assembly. The stator plates 5 are fixed relative to the front frame plate 9 and the portions 13 of the insulating frame rods in the manner shown in FIGURE 2 such that each portion 13 of the rods has, at its free end, a narrower portion 41 which lies in a suitable aperture of one of two supporting tongues 43 formed on each of the stator plates 7. The narrower portions 41 pass through conventional metallic spacer rings 45 positioned between the supporting tongues 43 and with clearance into the wider portions 47 of the axial bores 19 in the rear portions 15 of the frame rods. The portions 13 and 15 of the rods serve to clamp the stator assembly in position. The assembly jig and the set pins provide for the correct lateral positioning of the plate 9 relative to the rotor shaft so that the correct positioning of the stator plates relative to the rotor plates is ensured. The rear end of the rotor shaft provides for the correct positioning of the rear plate 11. After tightening the bolts 21, the frame and all of the components are securely fixed in their correct relative positions.

Since the front portion of the rotor shaft 1 is journalled in the metal plate 17 which has a coefficient of expansion which may be approximately equal to that of the metal forming the rotor shaft 1, this rotor shaft cannot stick in the central aperture of the plate 17 during temperature variations. The rear end of the rotor shaft 1 has a diameter which is considerably smaller than that of the portion of the shaft journaled in the plate 17, thus the risk of this rear end binding in the plate 11 of synthetic material is negligible.

The metal front plate 17 may be used for mounting the capacitor on a chassis plate (not shown). To accomplish this, the front plate is formed with two or more threaded apertures 51 which are preferably surrounded by somewhat outwardly elevated portions 53 of the front plate which may be pulled against the chassis plate by fastening bolts to be screwed into the apertures 51. The metal front plate 17 which is, for example, 1.5 mms. thick and 45 mms. square is very rigid so that tightening of the fastening bolts cannot cause deformation of the said plate and of the frame of the capacitor.

The above cited embodiments are intended as exemplary only, and while we have described our invention with a specific application and embodiment thereof, other modifications will be apparent to those skilled in the art without departing from the spirit and scope of the invention as defined by the appended claims.

What is claimed is:

1. A rotary capacitor assembly comprising a metal front plate, a first synthetic resin frame plate in adjacent parallel relation to said metal front plate, said first frame plate having a plurality of integral resin frame rods thereon, a second synthetic resin frame plate having a plurality of integral resin frame rods thereon, said plurality of frame rods of said first and second frame plates being positioned in spaced confronting relationship, each of said frame plates having a plurality of bores passing therethrough which extend axially through each of said frame rods, at least one stator plate mounted between at least two sets of said confronting frame rods, a dielectric sheet positioned adjacent each side of said stator plate, a metal shaft means passing through said metal front plate and rotatably journalled therein, said shaft means having at least one rotor plate rigidly mounted thereon, said rotor plate being located in substantially parallel spaced relation to said stator plate with one of said dielectric sheets being interposed therebetween, and a plurality of bolts passing through said bores in said first and second resin plates and threadedly engaging said metal front plate for connecting said previously mentioned plates, shaft means and stator plates and thereby providing a rigid capacitor assembly.

2. A rotary capacitor assembly according to claim 1 wherein said first frame plate includes means for angularly aligning said rotor plate with respect to said first frame plate.

3. A rotary capacitor assembly according to claim 1 wherein said shaft means and said first frame plate include means for limiting angular rotation therebetween.

4. A rotary capacitor assembly according to claim 1 wherein at least two of said frame rods on said first frame plate have stepped outer diameters thereby providing end portions of reduced diameter, said stator plate includes at least two apertures therein, said apertures being of a diameter substantially equal to the diameter of said reduced diameter end portions, and at least two frame rods on said second frame plate having counter bores coaxial with said bores with said reduced diameter end portions passing through said stator plate apertures and being in inserted relation with said counterbores thereby insuring correct alignment between said stator plate and said first frame plate.

References Cited

UNITED STATES PATENTS 2,079,921  5/1937  Osnos _____ 317—253

FOREIGN PATENTS 1,280,259  11/1961  France.

LEWIS H. MYERS, *Primary Examiner.*

E. GOLDBERG, *Assistant Examiner.*